United States Patent
Batra et al.

(10) Patent No.: US 6,317,061 B1
(45) Date of Patent: *Nov. 13, 2001

(54) DETACHABLE KEYBOARD

(76) Inventors: Sanjay Batra, 1330 N. Greenview Ave. #3, Chicago, IL (US) 60622; Anton R. Poole, 294 Levee Trail, Dakota Dunes, SD (US) 57049

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/168,602

(22) Filed: Oct. 8, 1998

(51) Int. Cl.[7] .................................................. G08C 19/12
(52) U.S. Cl. ............................. 341/22; 341/20; 345/168; 361/680
(58) Field of Search ........................ 341/20, 22; 400/489, 400/479; 345/168; 361/680; 710/73

(56) References Cited

U.S. PATENT DOCUMENTS

| | | | |
|---|---|---|---|
| 5,163,763 | 11/1992 | Weeks et al. | 400/124 |
| 5,228,791 | 7/1993 | Fort | 400/489 |
| 5,342,005 | 8/1994 | Szmanda et al. | 248/118 |
| 5,414,421 | 5/1995 | Saito | 341/22 |
| 5,443,320 | 8/1995 | Agata et al. | 400/715 |
| 5,546,334 | 8/1996 | Hsieh et al. | 364/709.11 |
| 5,588,759 | 12/1996 | Cloud | 400/472 |
| 5,596,481 | 1/1997 | Liu et al. | 361/683 |
| 5,865,546 | * 2/1999 | Ganthier | 400/489 |
| 5,890,015 | * 3/1999 | Garney | 395/882 |
| 5,983,073 | * 11/1999 | Ditzik | 455/11.1 |
| 5,991,546 | * 11/1999 | Chan | 395/882 |
| 6,035,350 | * 3/2000 | Swamy | 710/73 |
| 6,056,193 | * 5/2000 | McAuliffe | 235/380 |
| 6,058,441 | * 5/2000 | Shu | 710/100 |
| 6,094,700 | * 7/2000 | Deschepper | 700/129 |
| 6,104,604 | * 8/2000 | Anderson et al. | 361/680 |
| 6,243,035 | * 6/2001 | Walter et al. | 341/176 |

* cited by examiner

Primary Examiner—Albert K. Wong
(74) Attorney, Agent, or Firm—Kenneth J. Cool; Bradley A. Forrest; Schwegman, Lundberg, Woessner & Kluth

(57) ABSTRACT

A detachable keyboard provides options to a computer user between a complete keyboard and a partial keyboard. The detachable keyboard comprises two sections, a docking station having a set of functions and a partial keyboard having a different set of functions. The partial keyboard is removed from the docking station when the partial keyboard is desired. If the complete keyboard is desired, then the partial keyboard section is mated with the docking station to provide a user both sets of functions. The detachable keyboard and the partial keyboard section are operable in either a wireless or wired configuration with each other and a computer system.

25 Claims, 6 Drawing Sheets

DETACHABLE KEYBOARD

TECHNICAL FIELD OF THE INVENTION

The present invention relates generally to input devices and in particular to a detachable keyboard.

BACKGROUND OF THE INVENTION

In the field of personal computers, the desk-top computer includes a keyboard unit, a display unit and a main unit which contains all of the essential circuitry of the computer, such as the central processing unit (CPU), the power supply and data storage devices (e.g., floppy and hard disk). Personal computers support a variety of applications, some of which require extensive keyboard interaction while other applications merely require alphanumeric input.

Computer users typically choose the type of keyboard they want. Some want a very simple keyboard only supporting alphanumeric entries. Other computer users want a keyboard with alphanumeric entries plus additional functions. Once a user has selected a keyboard, the user is at a disadvantage in terms of not having the option to switch back and forth between a complete keyboard and a partial keyboard. Unless there are two separate keyboards available, the computer user does not have a choice between the complete keyboard versus a partial or reduced functionality keyboard.

A keyboard purchased for a home computer system typically supports one or more computer users. For instance, one computer user inputs data into the computer system via a ten-key pad section. With this feature included on a complete keyboard, the user is able to take advantage of the keyboard for data entry tasks. Other computer users may desire to play computer games, e.g., computer scrabble, where the keyboard is passed among game players for entry of selected letters. In this later example, a partial keyboard is more beneficial to the computer users. The partial keyboard is lighter in weight and smaller in size as compared to the complete keyboard, yet still provides users their desired data entries into the computer system.

Therefore, there is a need for a keyboard that is adaptable to provide the functions desired by a computer user.

SUMMARY OF THE INVENTION

A detachable keyboard provides options to a computer user between a complete keyboard and a partial keyboard. The complete keyboard serves as a traditional keyboard on a desktop or other flat service. The partial keyboard allows the user to remove it from the detachable keyboard and operate it as an input device, but at reduced functions. The full functionality of the detachable keyboard serves as a traditional keyboard on a desktop or other flat surface. The stripped down functionality of the detachable keyboard allows a user to remove the removable keyboard from the docking station and operate it as an input device separate from that of the docking station.

In one embodiment, the detachable keyboard is a keyboard comprising a first keyboard having a first set of functions, and a docking station having a second set of functions, wherein the docking station is adapted to receive the first keyboard that is coupled to the docking station. The first keyboard is operatively coupled to the keyboard docking station via a wired or wireless link. Likewise, the docking station is operatively coupled to a host system, such as a computer, via a wired or wireless link. Furthermore, the first keyboard is user selected for coupling directly to the host system instead of through the keyboard docking station.

In another embodiment, a computer system comprises a processor, and a keyboard coupled to the processor. The keyboard further comprises a first keyboard having a first set of functions, and a docking station having a second set of functions, wherein the docking station is adapted to receive the first keyboard that is coupled to the docking station. The first keyboard is coupled to the keyboard docking station via a wired or wireless link. Likewise, the docking station is coupled to a host system, such as a computer, via a wired or wireless link. The first keyboard is also user selected for coupling directly to the computer system instead of through the keyboard docking station.

The detachable keyboard is a device that is adaptable to the user's needs with respect to entering data and commands into a computer. If the user desires to simply enter textual information, the partial keyboard is removed from the docking station to meet the user's needs. Furthermore, since the partial keyboard is removable, the user may operate the keyboard in a more comfortable position, i.e., away from a desk top or other flat surface. In combination, the partial keyboard and the docking station provides a full function keyboard to the user.

Therefore, having a detachable keyboard permits a computer user to choose between a complete keyboard and a partial keyboard. In different embodiments of the invention, interfaces, keyboard layouts, and mode/status displays of varying scope are described. For instance, various embodiments presented herein for the detachable keyboard and the partial keyboard allow for operation in either a wireless configuration or a wired configuration with each other and the computer. Still other and further embodiments, aspects and advantages of the invention will become apparent by reference to the drawings and by reading the following detailed description.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the scope of the present inventions. The following detailed description is, therefore, not to be taken in a limiting sense.

Figure 1A:
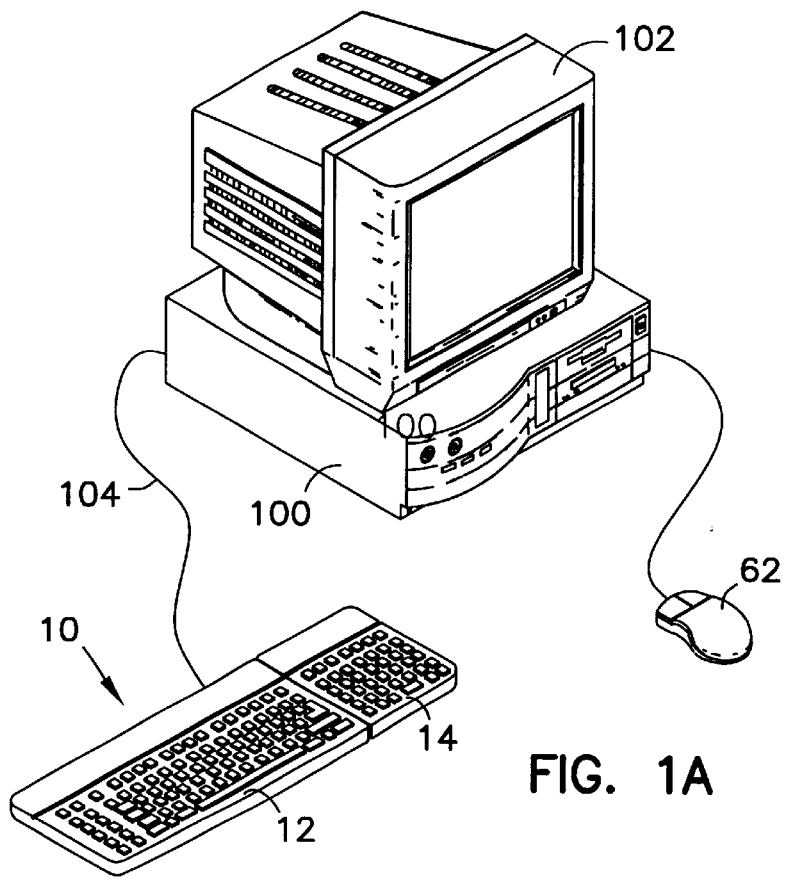
FIG. 1A is a perspective view of a typical computer system in which a detachable keyboard is implemented via a wired interface.
Figure 1B:
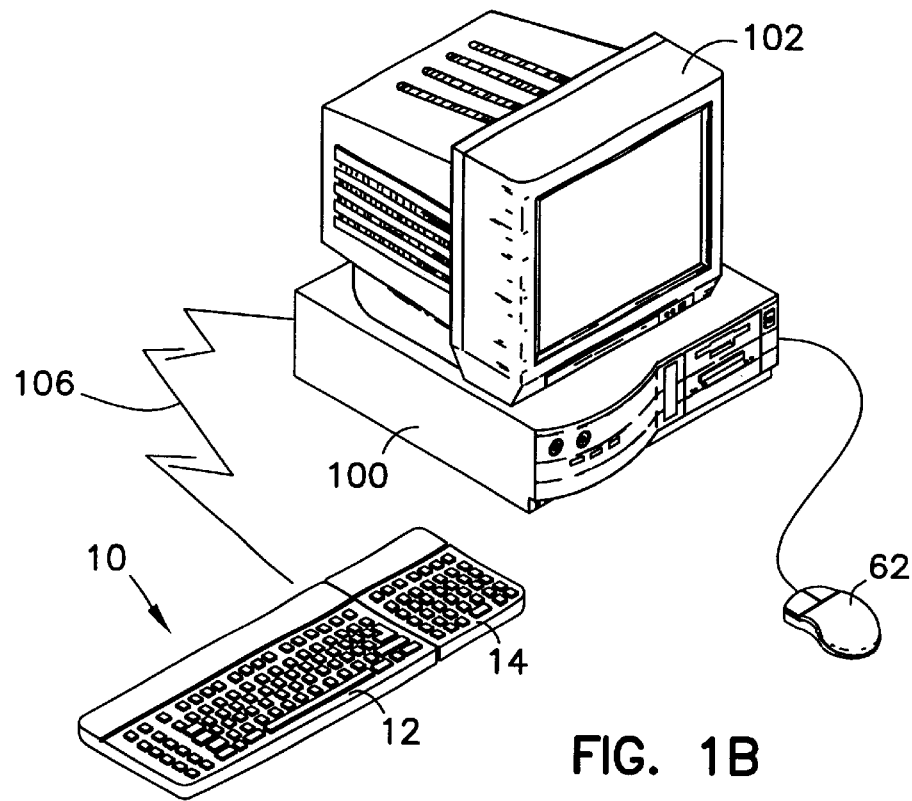
FIG. 1B is a perspective view of a typical computer system in which a detachable keyboard is implemented via a wireless interface.

FIGS. 1A and 1B are perspective views of a typical computer system 100 in which exemplary embodiments of a detachable keyboard 10 are implemented. In FIG. 1A, detachable keyboard 10 is implemented via a wired interface 104. FIG. 1B illustrates an alternative embodiment of detachable keyboard 10 implemented via a wireless interface 106.

Both of the exemplary embodiments illustrated in FIGS. 1A and 1B for detachable keyboard 10 comprises a partial keyboard 12 and a docking station 14 wherein the full functionality of the detachable keyboard 10 serves as a traditional keyboard on a desktop or other flat surface. The stripped down functionality of the detachable keyboard 10 allows a user to remove the partial keyboard 12 from the docking station 14 and operate it as an input device separate from that of the docking station 14.

Operation of partial keyboard 12 is ideal for a variety of "laptop" positions, i.e., partial keyboard 12 is placed in the lap of a user such that the user operates the partial keyboard 12 while in a comfortable, sitting position. In this scenario, the partial keyboard 12 remains operatively coupled to the docking station 14 via a wired or wireless interface. Alternatively, the partial keyboard 12 is coupled directly to the computer 100 and by passes the docking station 14.

Still referring to FIGS. 1A and 1B, computer 100 is coupled to monitor 102. Computer 100 further includes a microprocessor, random access memory (RAM), read only memory (ROM), and one or more storage devices, such as a hard disk drive, a floppy disk drive (into which a floppy disk can be inserted), an optical disk drive, and a digital tape cartridge drive. Detachable keyboard 10 is not limited to any type of computer 100. The construction and operation of such computers are well known in the art.

Monitor 102 permits the display of information for viewing by a user of computer 100. The invention is likewise not limited to any particular monitor 102. Monitors 102 include cathode ray tube (CRT) displays, as well as flat panel displays such as liquid crystal displays (LCDs). Pointing device 62 permits the control of a screen pointer provided by a graphical user interface of operating systems such as versions of Microsoft Windows®. The detachable keyboard 10 is not limited to any particular pointing device 62. Such pointing devices include mouses, touch pads, trackballs and point sticks. In one embodiment, computer 100 is a Gateway 2000, Inc., desktop personal computer and monitor 102 includes a CRT display.

Figure 2:
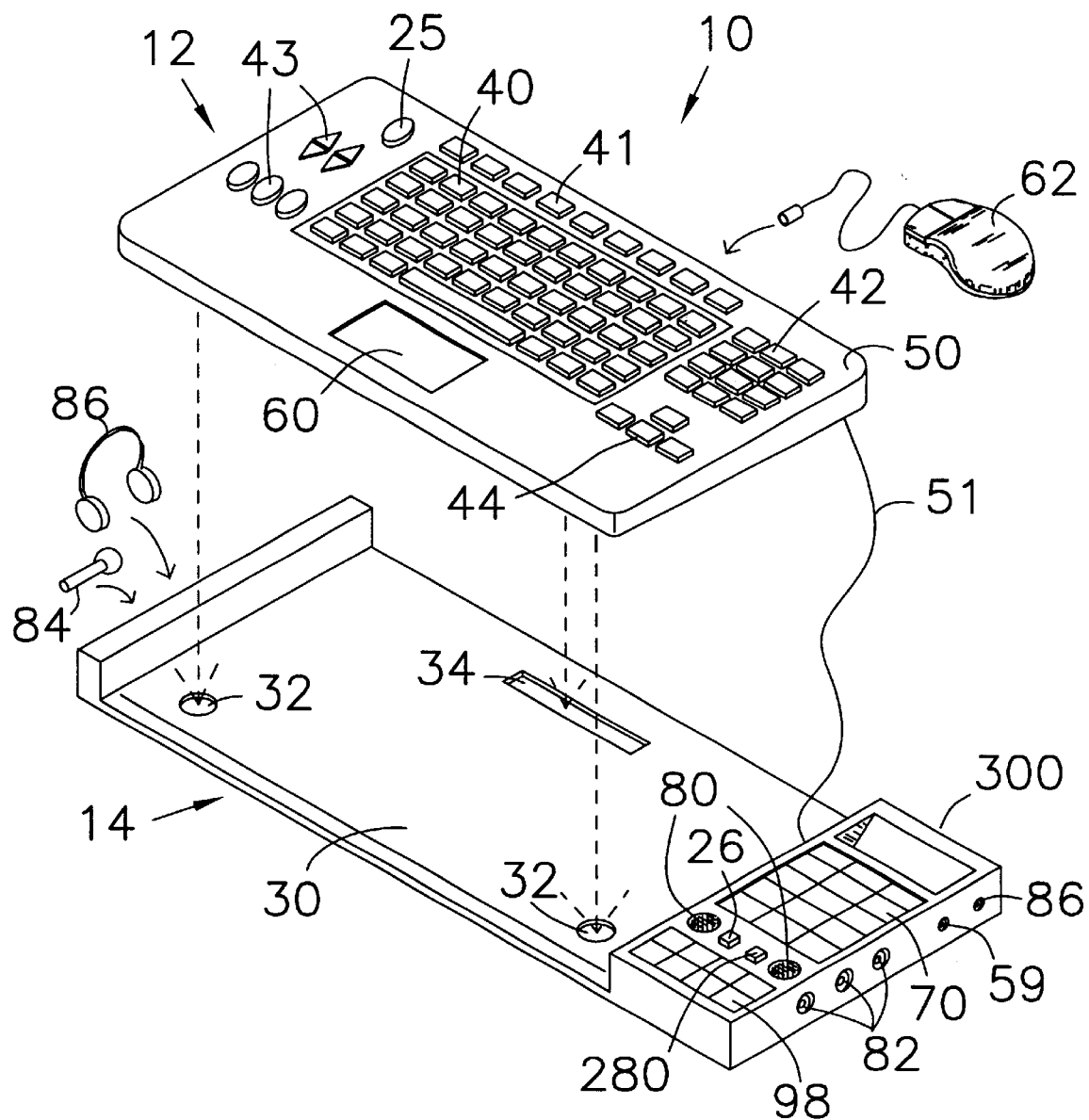
FIG. 2 is a perspective view of a docking station and a detached partial keyboard.

FIG. 2 is a perspective view of one embodiment of a detachable keyboard 10. Partial keyboard 12 is illustrated as decoupled or detached from the docking station 14. Coupling and decoupling the partial keyboard 12 with the docking station 14 is described in more detail within the following description. The partial keyboard 12 comprises a reduced set of functions which help minimize its size and weight when separated from the docking station 14.

The partial keyboard 12 is coupled to the docking station 14 via an interface 51. Information generated by the partial keyboard 12 is provided to the docking station 14 which in turn relays the information to the computer 100 via interface 104 or 106. The interface 51 may be implemented in either a wired or wireless configuration. A more detailed discussion on implementation of electrical interface 51 as well as electrical interfaces 104 and 106 are provided when reference is made to FIGS. 4A–B.

In referring to FIG. 2, the minimized set of functions associated with the partial keyboard 12 serves as an exemplary embodiment of a keyboard layout and is not to be taken as a limitation. Alternative keyboard layouts for providing other sets of functions should be apparent to those skilled in the art. Any function not placed on the partial keyboard 12 may be located on the docking station 14, and vice-versa.

The partial keyboard 12 has many of the standard features provided on a regular keyboard. Partial keyboard 12 has a plurality of alphanumeric keys 40 arranged on a keyboard surface 50. Other keys include a set of function keys (F1–F12) 41, a numeric keypad 42, a set of cursor control arrow keys 44, a set of TV/PC convergent keys 43, and a power button 25. The function of all of these keys are well known to one skilled in the art.

Partial keyboard 12 further comprises a pointing device 60, such as a touch pad or a trackball, located below the alphanumeric keys 40. In addition to the pointing device 60 integrated into the partial keyboard 12, the partial keyboard 12 has a connector for operatively coupling with an external pointing device, such as a mouse 62. Interfacing the mouse 62 to the partial keyboard 12 requires a driver (not shown) to be located within the partial keyboard 12. Interfacing a mouse 62 directly to the keyboard is well known to one skilled in the art.

The functions provided via the layout of the partial keyboard 12 illustrated in FIG. 2 serves only as an exemplary embodiment of a partial keyboard 12 and one skilled in the art will readily recognize alternative keyboard layout options. Functions not located on the partial keyboard 12 may be located on docking station 14.

As previously stated, the docking station 14 provides functions beyond those provided by the partial keyboard 12. A mode/status display 70 conveys to a computer user information such as battery status or a power management operating level. Mode/status display 70 is particularly beneficial when wireless interface 106 is implemented. The docking station 14 supports either an internal or external power supply to power the transceiver located within. The internal power operates off of batteries or from an external source, such as connection to a wall outlet. Status of these power sources are displayed by the mode/status display 70.

In addition, the docking station 14 further comprises a battery recharging system for charging the internal batteries. The recharging system is operational when the docking station is connected to an external power source via plug 59. Implementation of internal and external power supplies, battery recharging systems and the status of such information via the display 70 are well known to one skilled in the art. Power button 26 interfaces with the internal and external power supply for turning on and off the docking station 14.

Docking station 14 has a variety of other functions. For instance, internal speakers 80 are provided as well as multiple game ports 82. The game ports 82 support items such as a joystick, a flying yoke or a game controller. A microphone port 84 and a headset port 86 are provided on the docking station 14. Media controls 98 display information to the user as to whether the computer 100 is operating from its hard drive or from a device located within a drive bay slot, e.g., a floppy disk, a CD ROM, a tape backup system, etc. Implementation of the media controls 98 are well known to one skilled in the art.

Docking station 14 further comprises a USB hub 86 when the interface with computer 100 is via USB. A USB hub 86 is well known to one skilled in the art, wherein such hubs allow USB peripheral devices to be plugged directly into the docking station 14.

Figure 3:
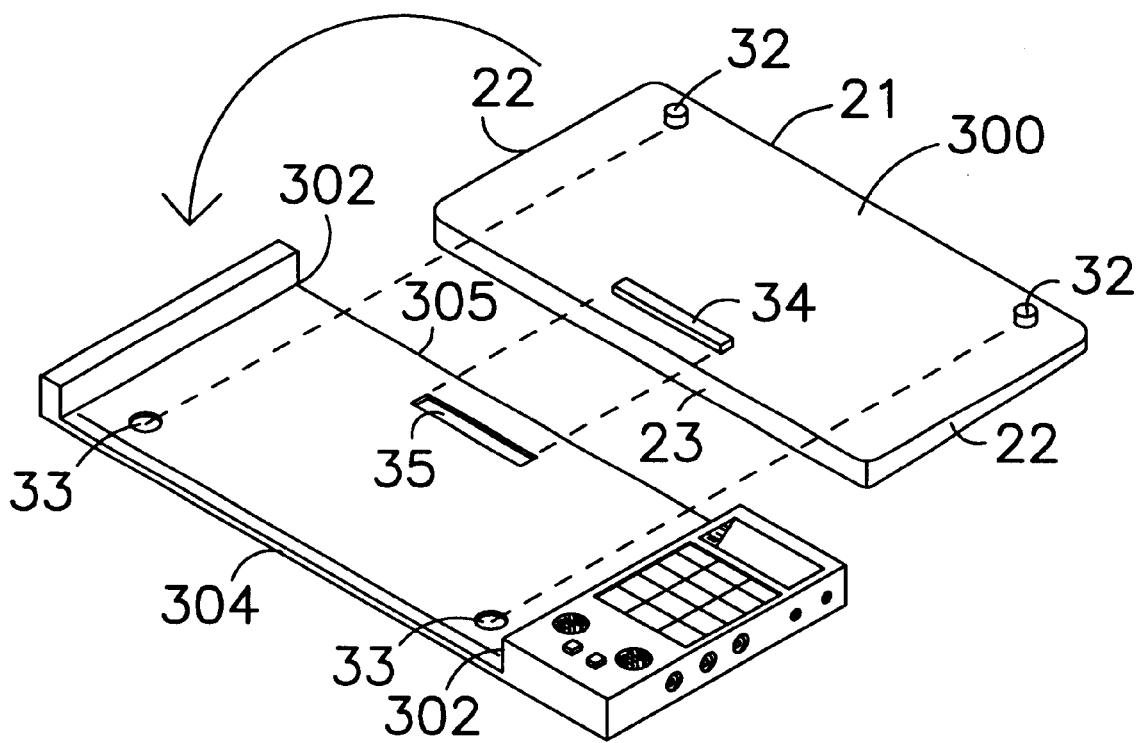
FIG. 3 is a perspective view on a physical interface between a partial keyboard and a docking station.

When a user desires a full function keyboard configuration, the partial keyboard 12 is physically mated or docked with the docking station 14. To assist in holding the partial keyboard 12 in place, extensions 32 and 34 are located on the underside 300 of the partial keyboard 12, as illustrated in FIG. 3. FIG. 3 illustrates the underside 300 of the partial keyboard 12 and the top side of the docking station 14. Only a physical connection between the partial keyboard 12 and the docking station 14 is illustrated in FIG. 3. Electrical connections between these two components are discussed when reference is made to FIGS. 4A–B.

Extensions 32, 34 protrude or extend outward from the underside 300. The extensions 32, 34 are sized for inserting into corresponding openings or recesses 33, 35 located on the docking station 14. When the partial keyboard 12 is dropped or coupled in place with the docking station 14, the extensions 33, 35 are inserted into openings 32, 34 which hold the partial keyboard 12 in place.

In addition to the extensions 32, 34 holding the partial keyboard 12 in place, the exterior dimensions of the partial keyboard 12 are selected to match the corresponding sections on the docking station 14. Still referring to FIG. 3, the length of sides 22 on the partial keyboard 12 are substantially the same length as sides 302 of the docking station 14. Likewise, a front edge 21 and a rear edge 23 of the partial keyboard 12 are substantially the same length and contour as corresponding edges 304, 305 on the docking station 14.

Once the partial keyboard 12 is inserted onto the docking station 14, the detachable keyboard 10 has a smooth and streamlined appearance. To decouple the partial keyboard 12, a user inserts their fingers between the partial keyboard 12 and the docking station 14 to lift up on the underside 300 of the partial keyboard 12. Once extensions 32, 34 clear their corresponding recesses 33, 35 the user is unobstructed in removing the partial keyboard 12 for operation. One skilled in the art recognizes other methods of coupling the partial keyboard 12 with the docking station 14.

Figure 4A:
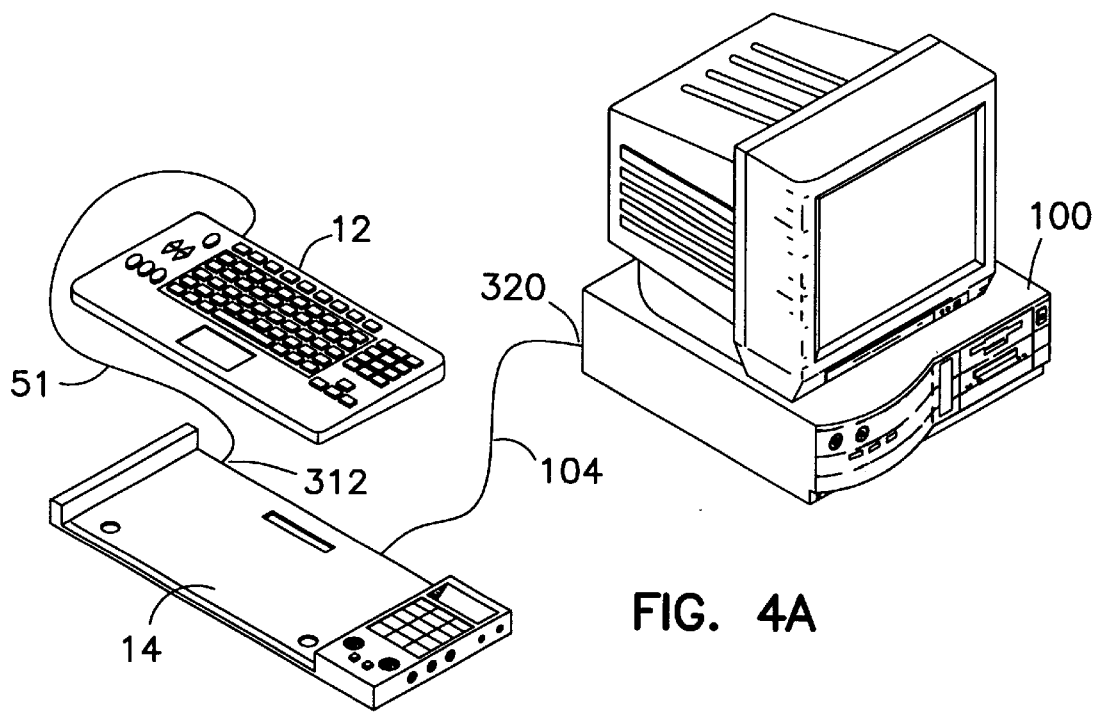
FIGS. 4A and 4B illustrate various embodiments on an electrical interface between a partial keyboard and a docking station.
Figure 4B:
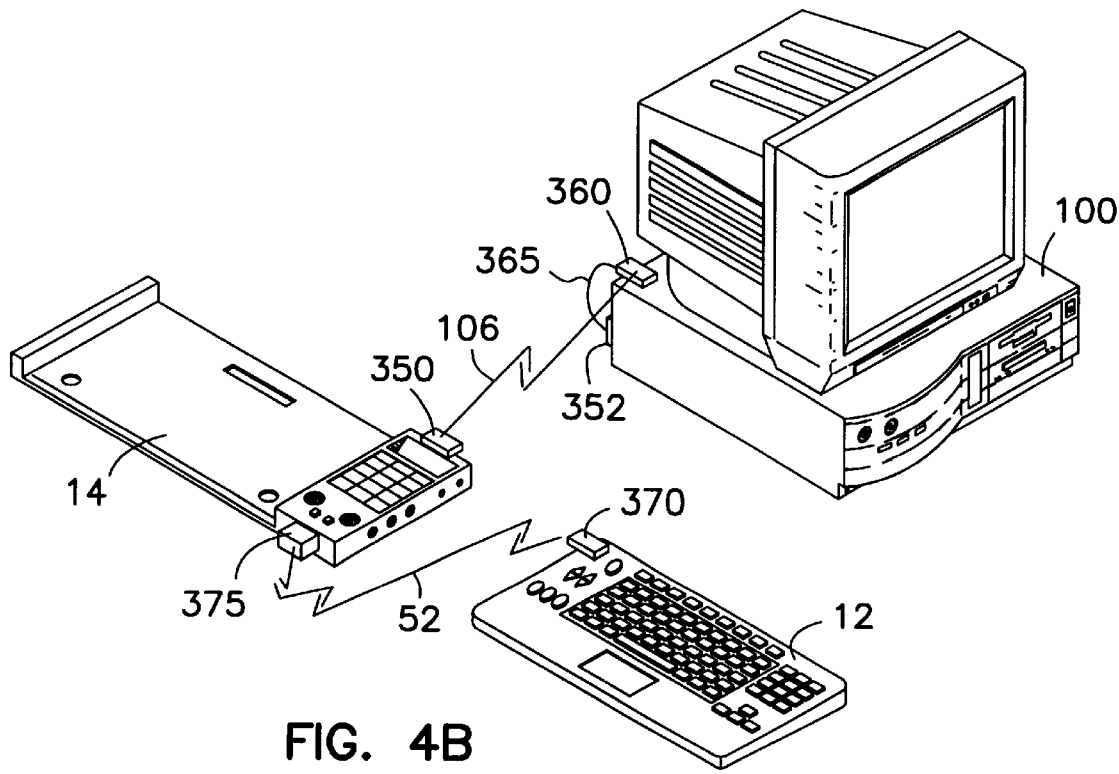

Various embodiments with respect to electrical connections between the partial keyboard 12 and the docking station 14 and the computer 100 are illustrated in FIGS. 4A–B. First, the interface standard between the computer 100 and the docking station 14 is Universal Serial Bus (USB). However, other interface standards are acceptable, such as serial and PS/2®. Secondly, the interface 51 between the partial keyboard 12 and the docking station 14 is USB with other acceptable standards also being serial or PS/2®. Implementation of any one of these interface standards is well known to one skilled in the art.

In one electrical interface embodiment, FIG. 4A illustrates wired interface 104 connected to plug 320 on the computer 100. Likewise, the partial keyboard 12 has a wired interface 51 wherein this interface 51 is coupled to the docking station 14 via plug 312. When the partial keyboard 12 communicates with the docking station 14, a keyboard controller and supporting circuitry is located within the docking station 14 to receive the information generated by the partial keyboard 12, which then passes along or relays that information to the computer 100. Implementation of a wired interface 104 and a wired interface 51 are well known to one skilled in the art.

In an alternative electrical interface embodiment, FIG. 4B illustrates a wireless interface 106 between the docking station 14 and the computer 100. Likewise, interface 52 between the partial keyboard 12 and the docking station 14 is wireless. These wireless interfaces 52, 106 may be implemented in either the infrared or radio frequency spectrum. Implementation of a wireless interface 51, 106 via anyone of these frequency spectrums is well known to one skilled in the art.

The wireless interfaces 52, 106 in FIG. 4B are implemented in the infrared spectrum. The corresponding transceivers must have a substantially unobstructed line of sight interface to effectively communicate with each other. Docking station 14 has a transceiver infrared port 350 which is coupled to an infrared port 352 on the computer 100 via port extension 360. Port extension 360 is positionable around the computer so that the docking station 14 has an unobstructed field of view with the infrared port extension 360 located on the computer 100. Port extension 360 thus acts as an interface between port 352 and port 350 via a cable 365.

The interface 52 between the partial keyboard 12 and the docking station 14 is also implemented in the infrared spectrum. Port 370 transmits information to port 375 located on the forward portion of the docking station 14. By placing the infrared port 375 on the forward portion of the docking station, an unobstructed field of view is provided to the partial keyboard 12.

The transmission link between the partial keyboard 12 and the docking station 14 is one way. The partial keyboard 12 only transmits information and does not contain a receiver. The transmission link between the docking station 14 and the computer 100 is a two way communications link. A transceiver is located within the docking station 14 and within the computer 100.

As an alternative embodiment, the partial keyboard 12 transmits information directly to port extension 360 located near the computer 100 instead of having the information relayed by the docking station 14. Turning off the power button 26 located on the docking station 14 allows the partial keyboard 12 to transmit directly to the computer 100 without having the docking station 14 relay the information.

In lieu of infrared communications, radio frequency communications may be implemented. Instead of having extension 360 to receive infrared signals, the extension is replaced by an antenna for transmitting and receiving radio frequency signals.

Figure 5A:
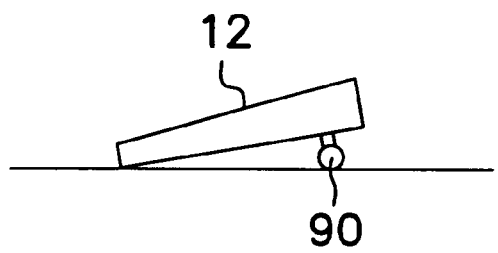
FIGS. 5A and 5B are side views of a partial keyboard having extendable legs for positioning on an operating surface.
Figure 5B:
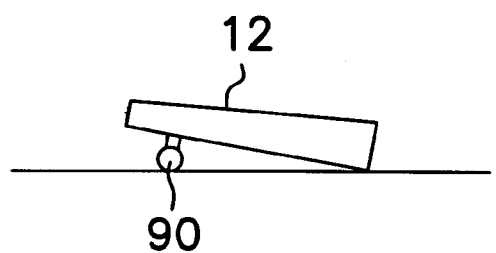

Detachable keyboard 12 is designed to provide a comfortable feel to a user. For example, the partial keyboard 12 is designed so that its center line and center of gravity are ideally located to provide a balanced feel. Also included as part of the design for detachable keyboard 12 is a set of extendable legs 90, as shown in FIGS. 5A and 5B. FIGS. 5A and 5B illustrates a side view of the partial keyboard 12 having legs 90 in either a "tilt" or a "bail" position, respectively. Extendable legs 90 are located on the underside to provide a comfortable position when a computer user is inputting data via the partial keyboard 12 while in a "lap" position. Implementation of folding legs 90 are well known to one skilled in the art.

Figure 6:
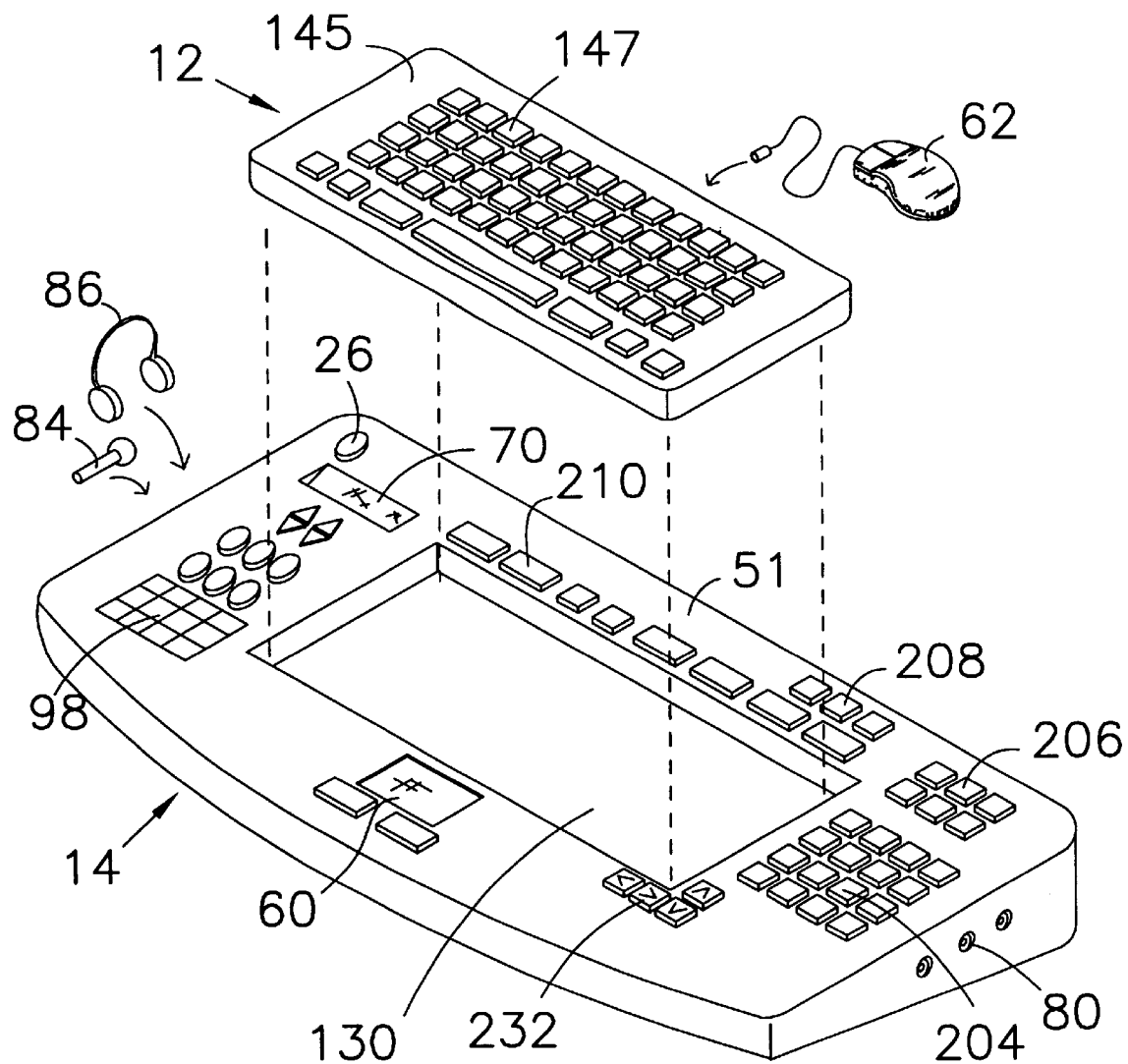
FIG. 6 is a perspective view of an alternative embodiment of a detachable keyboard.

Referring to FIG. 6, a perspective view of an alternative embodiment of a detachable keyboard 10 is presented. Partial keyboard 12 and docking station 14 communicate with each other and with the computer 100 illustrated in FIG. 1 via anyone of the wired or wireless interface methods as described when reference was made to FIGS. 4A and 4B.

In this particular embodiment, partial keyboard 12 is stored within opening 130. The depth and outside dimensions of opening 130 are sized to receive partial keyboard 12. Keyboard surface 145 is limited to a plurality of keys 147 for entry of alphanumeric data into the computer 100. This embodiment of partial keyboard 12 provides for a light weight and a very limited function keyboard.

Additional functions are provided on docking station 14. For example, the following functions are located on docking station 14: a ten-key input pad 204, an insert/delete keypad 206, arrow keys 232, a print screen, pause, scroll lock set of keys 208, and a function key row 210. The same type of mode/status display 70 described in FIG. 2 is also included on keyboard surface 50. The power button 25 powers on or off the docking station 14.

Docking station 14 further comprises a pointing device 60, such as a touch pad or a trackball. In lieu of pointing device 60, the capability of supporting a mouse 62 is also provided by partial keyboard 12. Mouse 62 plugs directly into partial keyboard 12.

Docking station 14 has internal speakers 80 as well as multiple game ports 82. These game ports 82 support items such as a joystick, a flying yoke or a game controller. A microphone port 84 and a headset port 86 are also provided on docking station 14. Media controls 98 display information to the user as to whether the computer 100 is operating from its hard drive or from a device located within a drive bay slot, e.g., a floppy disk, a CD ROM, a tape backup system, etc.

A detachable keyboard 10 has been described. The advantage of the detachable keyboard 10 is that it provides options to a computer user between a full function keyboard and a stripped down reduced function keyboard when inputting data into a computer 100. The detachable keyboard 10 comprises two sections, a docking station 14 and a partial keyboard 12. The docking station 14 and the partial keyboard 12 are operable in either a wireless or wired configuration with each other and the computer 100.

Although specific embodiments have been illustrated and described herein, it will be appreciated by those skilled in the art that any arrangement which is calculated to achieve the same purpose may be substituted for the specific embodiment of the present invention. This application is intended to cover any adaptations or variations of the present invention. Therefore, it is manifestly intended that this invention be limited only by the following claims and equivalents.

What is claimed is:

1. A computer keyboard for providing input to a computer, the keyboard comprising:

a first keyboard having a first set of functions; and a docking station having a second set of functions, wherein the docking station is adapted to receive the first keyboard such that the first keyboard is coupled to the docking station to provide input to the computer, and wherein the first keyboard is operable to provide input to the computer separate from the docking station.

2. The computer keyboard of claim 1, wherein the first keyboard is coupled to the docking station via a wireless interface.

3. The computer keyboard of claim 1, wherein the first keyboard is coupled to the docking station via a wired interface.

4. The computer keyboard of claim 1, wherein the docking station is coupled to a host system and the first keyboard provides the first set of functions to the host system via the docking station.

5. The computer keyboard of claim 4, wherein the first keyboard is operable for coupling directly to the host system instead of through the docking station.

6. The computer keyboard of claim 4, wherein the docking station is coupled to the host system via a wireless interface.

7. The computer keyboard of claim 4, wherein the docking station is coupled to the host system via a wired interface.

8. The computer keyboard of claim 4, wherein the host system is coupled to the docking station via a Universal Serial Bus interface.

9. The computer keyboard of claim 8, wherein the docking station further comprises Universal Serial Bus outputs for interfacing with a plurality peripheral devices compatible with the Universal Serial Bus.

10. The computer keyboard of claim 1, wherein the first keyboard further comprises a surface having a plurality of keys arranged thereon, wherein each key corresponds to one of a set of letters, numbers, symbols, or functions.

11. The computer keyboard of claim 1, wherein the first keyboard further comprises a cursor control device.

12. A computer keyboard for providing input to a computer, the keyboard comprising:

a docking station having a first set of keys surrounding a depression in a first surface of the docking station; and a first keyboard coupled to the docking station, wherein the first keyboard has a second set of keys and is shaped to fit in the depression such that the first and second set of keys form a full function keyboard and wherein the first keyboard is operable to provide input to the computer separate from the docking station.

13. The computer keyboard of claim 12, wherein the first keyboard is coupled to the docking station via a wireless interface.

14. The computer keyboard of claim 12, wherein the docking station further comprises a universal serial bus interface.

15. The computer keyboard of claim 12, wherein the docking station is coupled to a host system and the first keyboard provides a first set of functions to the host system via the docking station.

16. The computer keyboard of claim 15, wherein the docking station is coupled to the host system via a wireless interface.

17. A computer system, comprising:

a processor; and a keyboard coupled to the processor for providing input to the processor, wherein the keyboard comprises:

a first keyboard having a first set of functions; and a docking station having a second set of functions, wherein the docking station is adapted to receive the first keyboard and wherein the first keyboard is operable to provide input to the processor separate from the docking station.1. A computer keyboard comprising:

a first keyboard having a first set of functions; and a docking station having a second set of functions, wherein the docking station is adapted to receive the first keyboard such that the first keyboard is coupled to the docking station and wherein the first keyboard is operable separate from the docking station.

18. The computer system of claim 17, wherein the docking station is coupled to the computer system, and the first keyboard provides the first set of functions to the host system via the docking station.

19. The computer system of claim 18, wherein the first keyboard is coupled directly to the computer system.

20. The computer system of claim 17, wherein the docking station is coupled to the computer system via a wireless interface.

21. The computer system of claim 17, wherein the docking station is coupled to the host system via a wired interface.

22. The computer system of claim 17, wherein the first keyboard is coupled to the docking station via a wireless interface.

23. The computer system of claim 17, wherein the first keyboard further comprises a keyboard surface having a plurality of keys arranged thereon, wherein each key corresponds to one of a set of letters, numbers, symbols, or functions.

24. The computer system of claim 17, wherein the processor is coupled to the keyboard via a Universal Serial Bus interface.

25. The computer system of claim 24, wherein the docking station further comprises Universal Serial Bus (USB) outputs for interfacing with a plurality peripheral devices compatible with the USB.

* * * * *